US012713363B2

(12) United States Patent
Liu et al.

(10) Patent No.: US 12,713,363 B2
(45) Date of Patent: Aug. 18, 2026

(54) ENHANCED TRANSMISSION POWER LIMIT AND JOINT INPUT POWER LIMIT FOR TRANSMISSIONS FROM MULTIPLE ANTENNA PORTS FOR RADIO FREQUENCY EXPOSURE COMPLIANCE

(71) Applicant: QUALCOMM Incorporated, San Diego, CA (US)

(72) Inventors: Tienyow Liu, Santa Clara, CA (US); Farhad Meshkati, San Diego, CA (US); Yahia Ramadan, San Jose, CA (US); Huang Lou, Santee, CA (US); Anant Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 18/362,615

(22) Filed: Jul. 31, 2023

(65) Prior Publication Data

US 2025/0048280 A1 Feb. 6, 2025

(51) Int. Cl.

*H04W 52/36* (2009.01)
*H04B 1/3827* (2015.01)
*H04W 52/28* (2009.01)
*H04W 52/42* (2009.01)

(52) U.S. Cl.

CPC ........ *H04W 52/367* (2013.01); *H04B 1/3838* (2013.01); *H04W 52/288* (2013.01); *H04W 52/42* (2013.01)

(58) Field of Classification Search

CPC . H04W 52/367; H04W 52/288; H04W 52/42; H04W 52/146; H04B 1/3838; H04B 7/0404; H04B 7/0691

See application file for complete search history.

(56) References Cited

U.S. PATENT DOCUMENTS

2023/0156612 A1* 5/2023 Chen ..................... H04W 52/42 370/318

OTHER PUBLICATIONS

3GPP TS 38.212: "3rd Generation Partnership Project, Technical Specification Group Radio Access Network, NR, Multiplexing and channel coding (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V17.5.0, Mar. 30, 2023, pp. 1-203, XP052284507, Section 7.3.1.1 and corresponding subsections.

(Continued)

*Primary Examiner* — Ayodeji O Ayotunde

(74) *Attorney, Agent, or Firm* — Patterson & Sheridan LLP

(57) ABSTRACT

Techniques and apparatus for enhancing transmission power limits and joint input power limits for transmissions from multiple antenna ports in compliance with radio frequency (RF) exposure limits are described. A method that may be performed by a wireless communication device includes receiving, from a network entity, an uplink grant scheduling an uplink transmission from a set of antennas. The uplink grant indicates a transmission mode for the uplink transmission. A respective transmission power limit is determined for each antenna in the set of antennas, based at least in part on the transmission mode and in compliance with an RF exposure limit. The uplink transmission is sent via the set of antennas according to the respective transmission power limits.

25 Claims, 9 Drawing Sheets

(56) References Cited

OTHER PUBLICATIONS

3GPP TS 38.214: "3rd Generation Partnership Project, Technical Specification Group Radio Access Network, NR, Physical layer procedures for data (Release 17)", 3GPP Standard, Technical Specification, 3rd Generation Partnership Project, Mobile Competence Centre ; 650, Route Des Lucioles, F-06921 Sophia-Antipolis Cedex, France, vol. RAN WG1, No. V17.5.0, Mar. 30, 2023, pp. 1-231, XP052284511, sections 6.1.1, 6.1.1.1, 6.1.1.2, 6.1.3.

International Search Report and Written Opinion—PCT/US2024/036328—ISA/EPO—Oct. 16, 2024.

* cited by examiner

902

Receive, from a network entity, an uplink grant scheduling an uplink transmission from a set of antennas, wherein the uplink grant indicates a transmission mode for the uplink transmission

904

Determine, for each antenna in the set of antennas, a transmission power limit based at least in part on the transmission mode and in compliance with an RF exposure limit

906

Send, via the set of antennas, the uplink transmission according to the respective transmission power limits

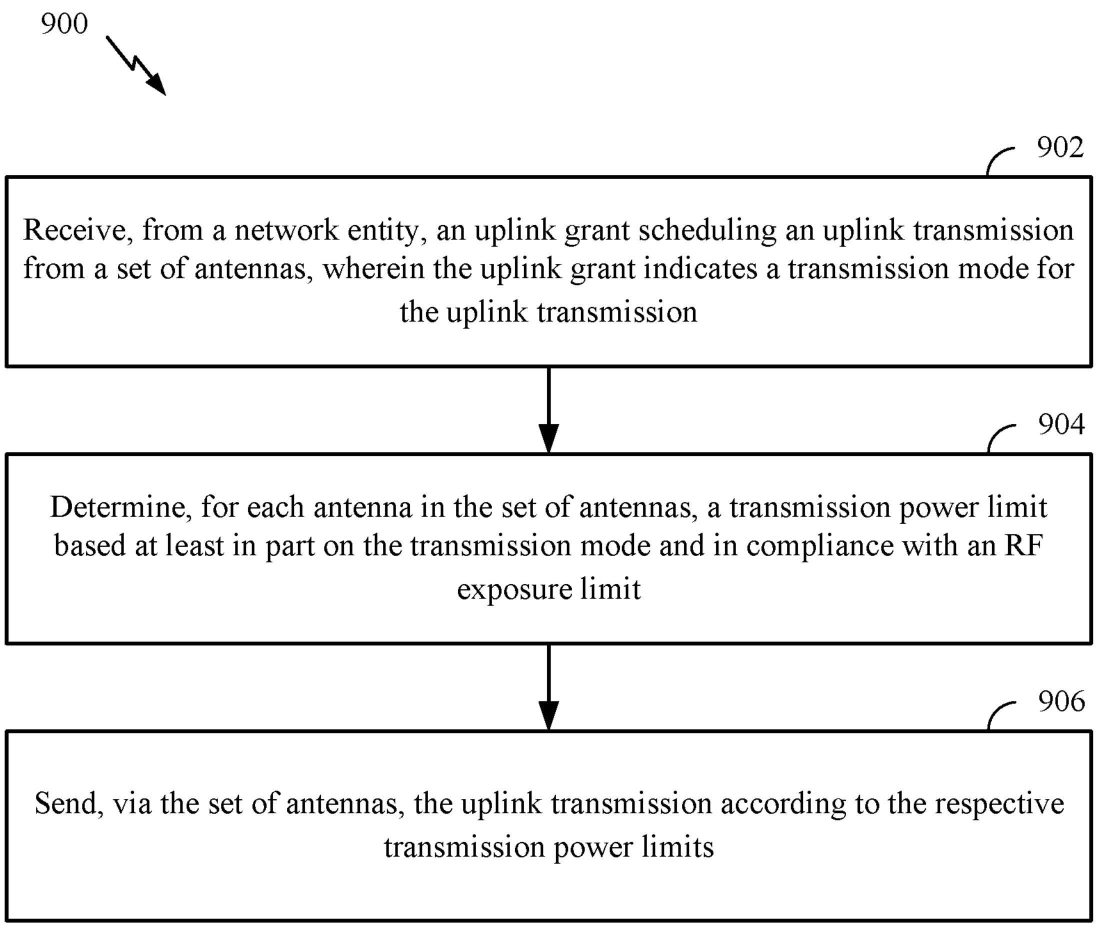

FIG. 9

ENHANCED TRANSMISSION POWER LIMIT AND JOINT INPUT POWER LIMIT FOR TRANSMISSIONS FROM MULTIPLE ANTENNA PORTS FOR RADIO FREQUENCY EXPOSURE COMPLIANCE

BACKGROUND

Field of the Disclosure

Aspects of the present disclosure relate to wireless communications, and more particularly, to techniques for increasing transmission power limits and/or joint input power limits for multiple-input, multiple-output (MIMO) transmissions from multiple antenna ports in compliance with radio frequency (RF) exposure limits.

Description of Related Art

Wireless communication systems are widely deployed to provide various telecommunication services such as telephony, video, data, messaging, broadcasts, etc. Modern wireless communication devices (such as smartphones) are generally mandated to meet RF exposure limits set by domestic and international standards and regulations. To ensure compliance with the standards, such devices may undergo an extensive certification process prior to being shipped to market. To ensure that a wireless communication device complies with an RF exposure limit, techniques have been developed to enable the wireless communication device to assess RF exposure from the wireless communication device and adjust the transmission power of the wireless communication device accordingly to comply with the RF exposure limit.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable transmit powers in compliance with RF exposure limits.

Certain aspects of the subject matter described in this disclosure can be implemented in a method for wireless communication by a wireless device. The method generally includes receiving, from a network entity, an uplink grant scheduling an uplink transmission from a set of antennas. The uplink grant indicates a transmission mode for the uplink transmission. The method also includes determining, for each antenna in the set of antennas, a respective transmission power limit based at least in part on the transmission mode and in compliance with a radio frequency (RF) exposure limit. The method further includes sending, via the set of antennas, the uplink transmission according to the respective transmission power limits.

Certain aspects of the subject matter described in this disclosure can be implemented in an apparatus for wireless communication. The apparatus generally includes a receiver, a memory, a processor coupled to the memory, and a transmitter. The receiver is generally configured to receive, from a network entity, an uplink grant scheduling an uplink transmission from a set of antennas. The uplink grant indicates a transmission mode for the uplink transmission. The processor is generally configured to determine, for each antenna in the set of antennas, a respective transmission power limit based at least in part on the transmission mode and in compliance with a radio frequency (RF) exposure limit. The transmitter is generally configured to send, via the set of antennas, the uplink transmission according to the respective transmission power limits.

Certain aspects of the subject matter described in this disclosure can be implemented in an apparatus for wireless communication. The apparatus generally includes means for receiving, from a network entity, an uplink grant scheduling an uplink transmission from a set of antennas. The uplink grant indicates a transmission mode for the uplink transmission. The apparatus also includes means for determining, for each antenna in the set of antennas, a respective transmission power limit based at least in part on the transmission mode and in compliance with a radio frequency (RF) exposure limit. The apparatus further includes means for sending, via the set of antennas, the uplink transmission according to the respective transmission power limits.

Certain aspects of the subject matter described in this disclosure can be implemented in a computer-readable medium. The computer-readable medium has instructions stored thereon for: receiving, from a network entity, an uplink grant scheduling an uplink transmission from a set of antennas, wherein the uplink grant indicates a transmission mode for the uplink transmission; determining, for each antenna in the set of antennas, a respective transmission power limit based at least in part on the transmission mode and in compliance with a radio frequency (RF) exposure limit; and sending, via the set of antennas, the uplink transmission according to the respective transmission power limits.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 9 is a flow diagram illustrating example operations for wireless communication, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
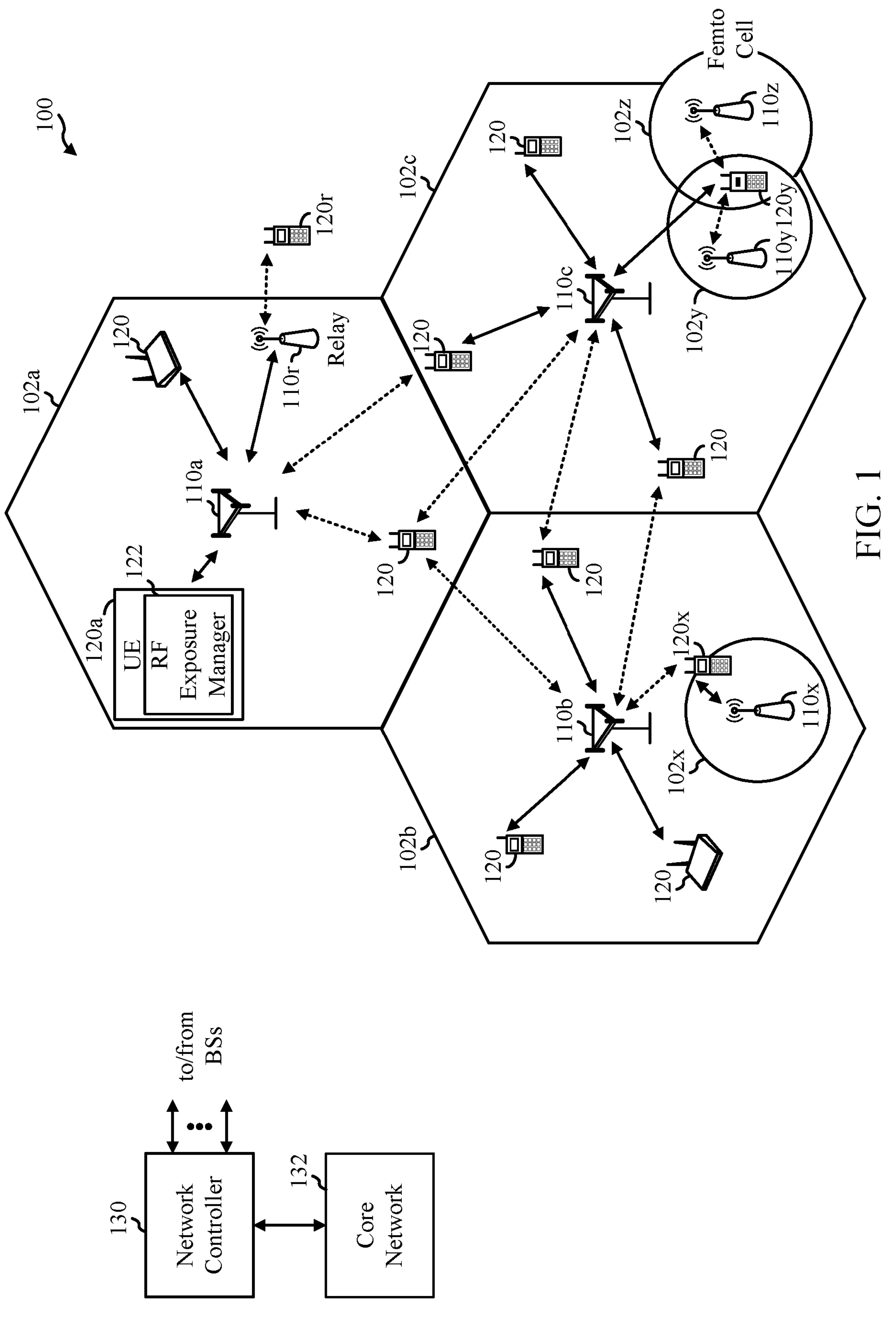
FIG. 1 is a block diagram conceptually illustrating an example wireless communication network, in accordance with certain aspects of the present disclosure.

Aspects of the present disclosure provide apparatus, methods, processing systems, and computer-readable mediums for increasing the transmission power limits and/or joint radio frequency (RF) exposure input power limits for transmissions from multiple antenna ports while complying with RF exposure limits. For example, the transmission from the multiple antenna ports may comprise a multiple-input, multiple-output (MIMO) transmission.

For example, a wireless communication device's transmission of uplink traffic may be subject to various RF exposure limits set by domestic and international regulatory bodies, such as the Federal Communications Commission (FCC) and International Commission on Non-Ionizing Radiation Protection (ICNIRP). Such RF exposure limits may apply regardless of whether the uplink transmission is a single-input, single-output (SISO) transmission or MIMO transmission.

To ensure compliance with an RF exposure limit, the wireless communication device (e.g., user equipment) may determine a maximum transmission power for a time interval based on an available RF exposure budget, which may be computed based on a maximum available power limit, RF exposure limit, previous transmission activities (e.g., previous transmit powers), or a combination thereof. In some cases, a wireless communication device may have multiple antennas, which can enable the device to transmit via one or more directions at different locations and/or orientations (e.g., azimuth and/or elevation) of the device. When multiple antennas are in the same antenna group, the RF exposure consumption may be assumed to be additive across all of the antennas in the group, such that the RF exposure budget is shared among all of those antennas. On the other hand, when multiple antennas are in different antenna groups, the RF exposure consumption from the multiple antennas may not be assumed to be additive as different antenna groups may have their own RF exposure budget.

However, the wireless communication device may not consider the type of uplink grant when determining the maximum transmission power to ensure compliance with an RF exposure limit. For example, the maximum transmission power determined by the wireless communication device may be the same regardless of whether the uplink grant is for SISO transmission or MIMO transmission. In certain cases, determining the maximum transmission power without taking into account the type of uplink grant can lead to the wireless communication device using a needlessly low transmission power to maintain RF exposure compliance, impacting the uplink performance, such as uplink data rates, as an illustrative, non-limiting example.

Certain aspects of the present disclosure described herein enable a wireless communication device to determine a transmission power limit for an uplink transmission based at least in part on a type of uplink grant for the uplink transmission. As described in greater detail herein, a wireless communication device may receive an uplink grant from a network entity (e.g., base station), where the uplink grant schedules an uplink transmission from a set of antennas of the wireless communication device and indicates a transmission mode (e.g., SISO transmission or MIMO transmission) for the uplink transmission. The wireless communication device may determine a transmission power limit for each antenna in the set of antennas based at least in part on the transmission mode and in compliance with an RF exposure limit. The wireless communication device may send the uplink transmission via the set of antennas according to the respective transmission power limits. By enabling the wireless communication device to take into account the type of uplink grant—in addition to other information including available RF exposure margin, antenna-port-to-antenna-group mapping, and previous transmit activities—when determining the transmission power limit, aspects described herein enable the wireless communication device to determine and transmit an uplink transmission according to an increased transmission power limit for transmissions from multiple antenna ports, significantly increasing the uplink performance for transmissions from multiple antennas while still complying with RF exposure limits.

The apparatus and techniques for enhancing transmission power limits and/or joint input power limits for transmission from multiple antenna ports may provide desirable uplink communication performance (e.g., higher uplink throughput, reduced latency, and/or increased transmission range) in compliance with RF exposure limits.

The following description provides examples of enhancing transmission power limits and joint input power limits for transmission from multiple antenna ports in compliance with RF exposure limits in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability specifications. These services may also have different transmission time intervals (TTIs) to meet respective quality of service (QOS) specifications. In addition, these services may co-exist in the same subframe.

The electromagnetic spectrum is often subdivided, based on frequency/wavelength, into various classes, bands, channels, etc. In 5G NR, two initial operating bands have been identified as frequency range designations FR1 (410 MHZ-7.125 GHz) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110*a-z* (each also individually referred to herein as BS 110 or collectively as BSs 110) and/or user equipment (UE) 120*a-y* (each also individually referred to herein as UE 120 or collectively as UEs 120) in the wireless communication network 100 via one or more interfaces.

As illustrated in FIG. 1, the UE 120*a* may include an RF exposure manager 122 that determines a transmission power limit for each antenna in a set of antennas based at least in part on an uplink grant type for an uplink transmission, in accordance with certain aspects of the present disclosure. Another wireless device in the wireless communication network 100 may alternatively or additionally include an RF exposure manager. For example, one or more of the BSs 110 may be configured as a customer premises equipment (CPE), and an RF exposure manager configured as described herein may be implemented in a BS or CPE.

A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
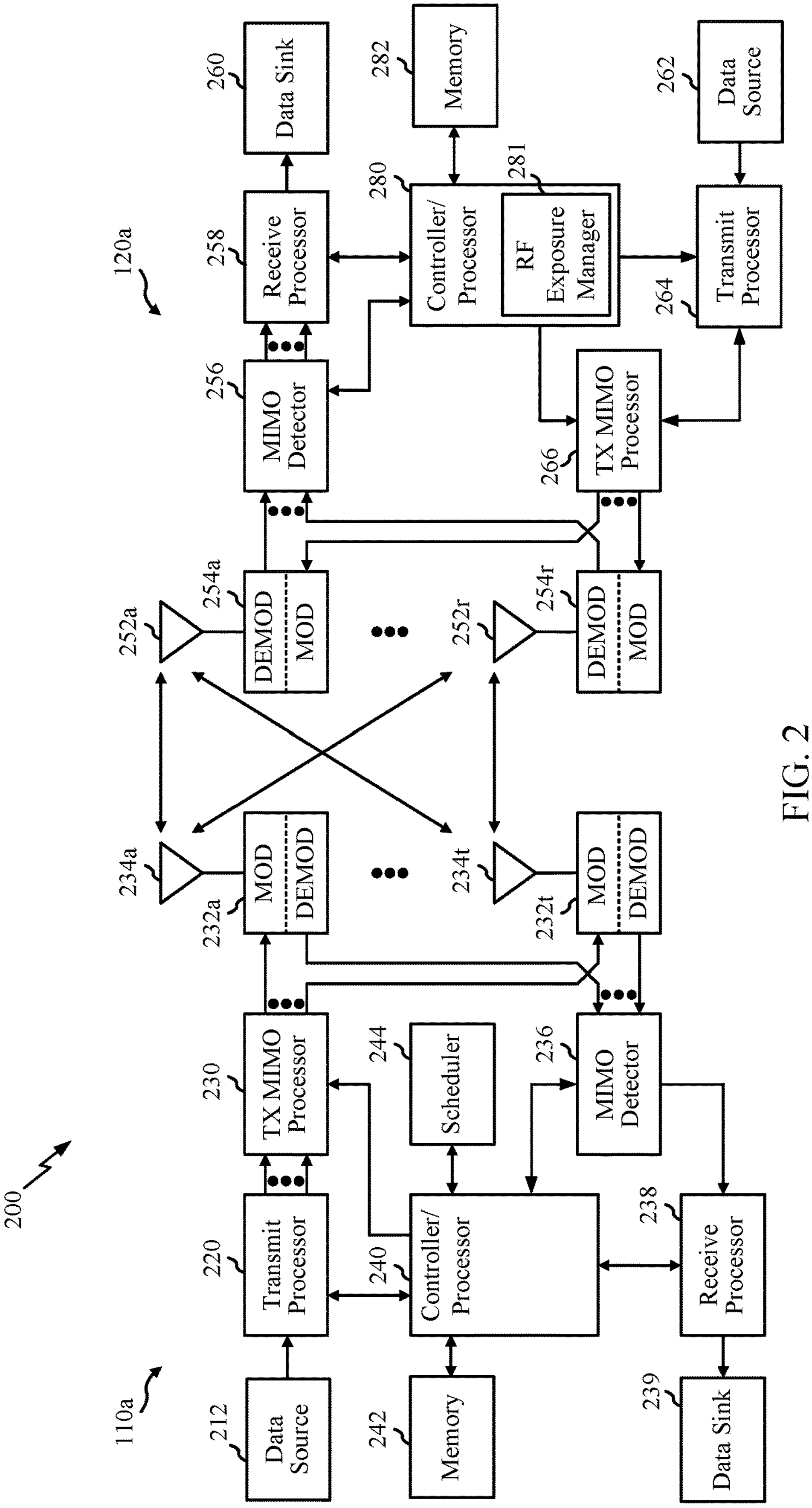
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC) control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the demodulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. As shown in FIG. 2, the controller/processor 280 of the UE 120*a* has an RF exposure manager 281 that may be representative of the RF exposure manager 122, according to aspects described herein. Although shown at the controller/processor, other components of the UE 120*a* and BS 110*a* may be used to perform the operations described herein.

While the UE 120*a* is described with respect to FIGS. 1 and 2 as communicating with a BS and/or within a network, the UE 120*a* may be configured to communicate directly with/transmit directly to another UE 120, or with/to another wireless device without relaying communications through a network. In some aspects, the BS 110*a* illustrated in FIG. 2 and described above may be an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz and other SCSs may be defined with respect to the base SCS (e.g., 30 kHz, 60 kHz, 120 kHz, 240 kHz, etc.).

Example RF Transceiver

Figure 3:
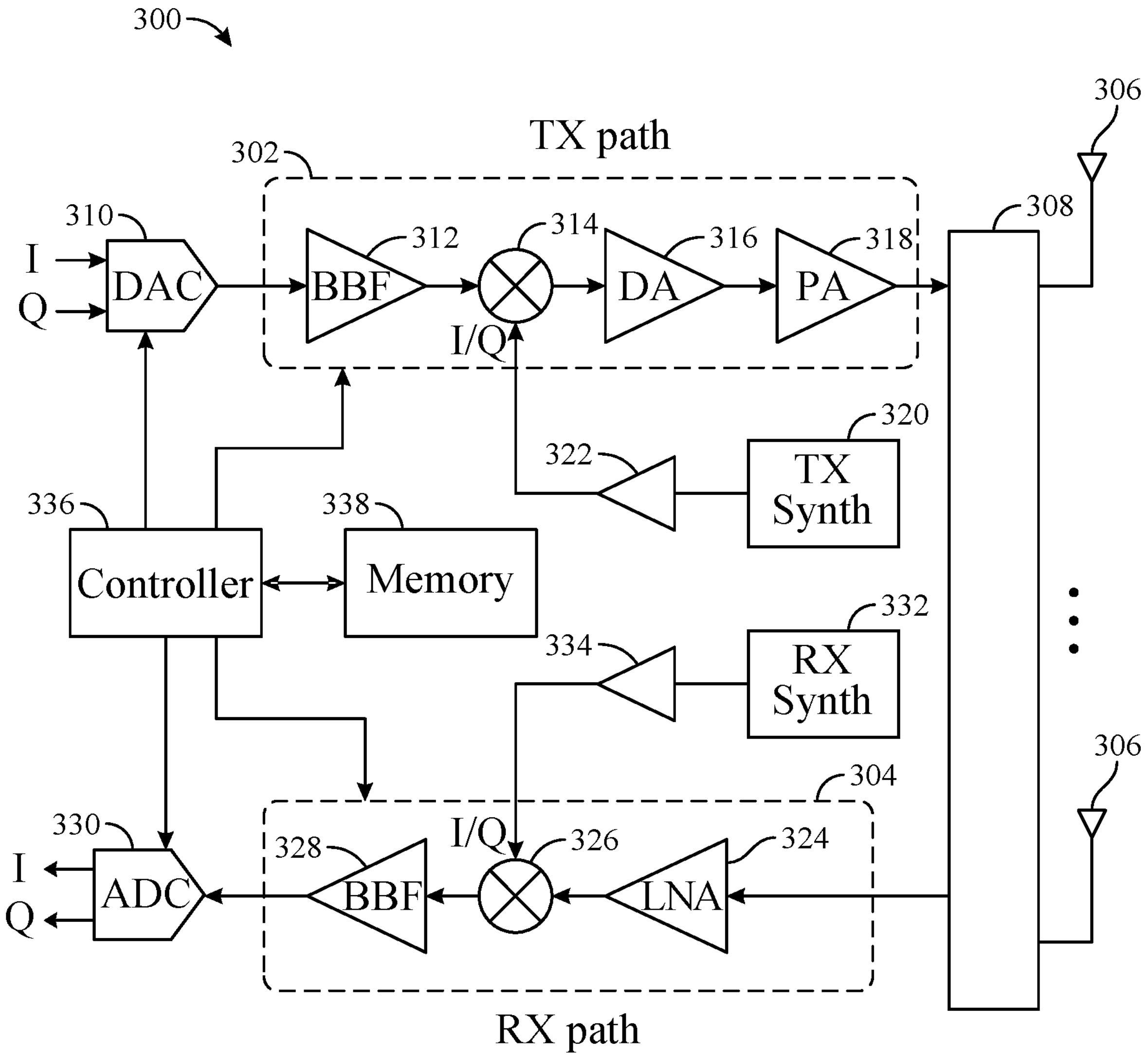
FIG. 3 is a block diagram of an example radio frequency (RF) transceiver, in accordance with certain aspects of the present disclosure.

FIG. 3 is a block diagram of an example RF transceiver circuit 300, which may be used in any of the wireless devices described above, in accordance with certain aspects of the present disclosure. The RF transceiver circuit 300 includes at least one transmit (TX) path 302 (also known as a "transmit chain") for transmitting signals via one or more antennas 306 and at least one receive (RX) path 304 (also known as a "receive chain") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Some systems may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmission power limit and/or joint input power limit for the TX path 302 (e.g., certain levels of gain applied to the BBF 312, the DA 316, and/or the PA 318) based at least in part on an uplink grant type to set a transmission power level that complies with an RF exposure limit set by domestic/international regulations and/or international standards, as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter ($mW/cm^2$). In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change.

SAR may be used in some configurations to assess RF exposure for transmission frequencies less than 6 GHZ, which cover wireless communication technologies such as 2G/3G (e.g., CDMA), 4G (e.g., LTE), 5G (e.g., NR in 6 GHz bands), IEEE 802.11ac, etc. PD may be used in some configurations to assess RF exposure for transmission frequencies higher than 10 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHZ (e.g., 3G, 4G, 5G, etc.) and a second wireless communication technology operating above 6 GHZ (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

Figure 4A:
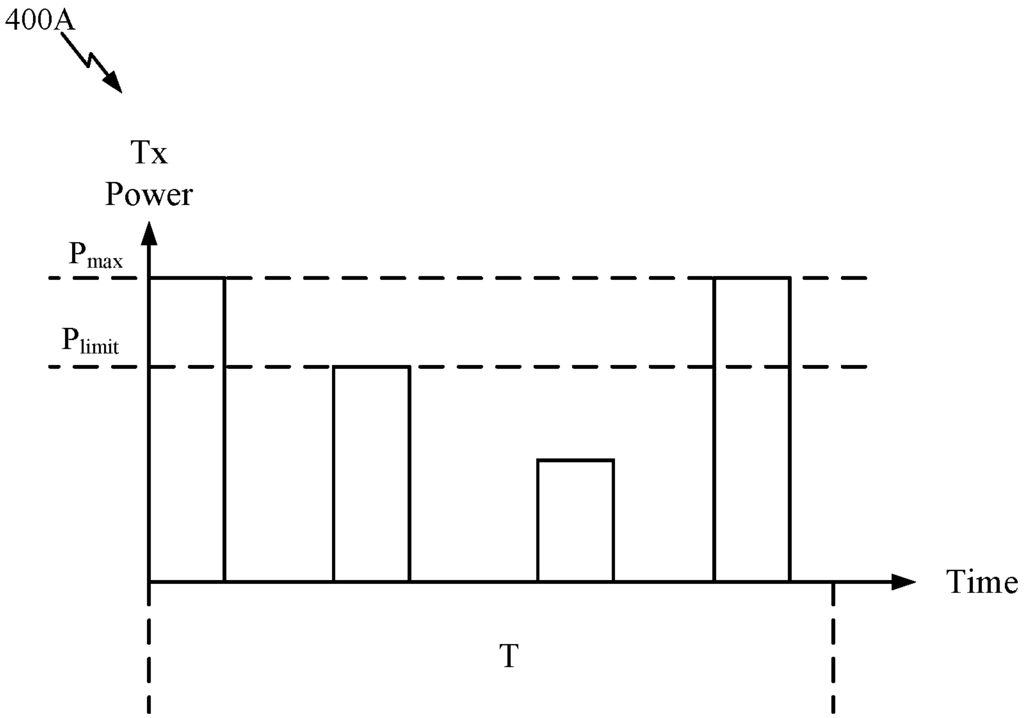
FIGS. 4A and 4B are graphs illustrating examples of transmit powers over time in compliance with an RF exposure limit, in accordance with certain aspects of the present disclosure.

In certain cases, time-averaging of RF exposure may be performed to be in compliance with the RF exposure limit within a specified running time window (T) (e.g., 2 seconds for 60 GHz bands, 100 or 360 seconds for bands≤6 GHz, etc.) associated with the RF exposure limit. For example, FIG. 4A is a graph 400A of a transmit power that varies over the time window (T) associated with the RF exposure limit, in accordance with certain aspects of the present disclosure. As an example, the transmit power may exceed the transmit power threshold $P_{limit}$ in certain transmission occasions in the time window (T). That is, the transmit power may be greater than the transmit power threshold $P_{limit}$. In certain cases, the UE may transmit at $P_{max}$, which is the maximum transmit power supported by the UE. In certain cases, the UE may transmit at a transmit power less than or equal to the transmit power threshold $P_{limit}$ in certain transmission occasions. The transmit power threshold $P_{limit}$ represents the time-averaged threshold for the RF exposure limit in terms of transmit power, and in certain cases, $P_{limit}$ may be referred to as the average power level or limit. The graph 400A also illustrates gaps between transmission bursts, where the gaps represent periods during which no transmission was sent from the device.

Figure 4B:
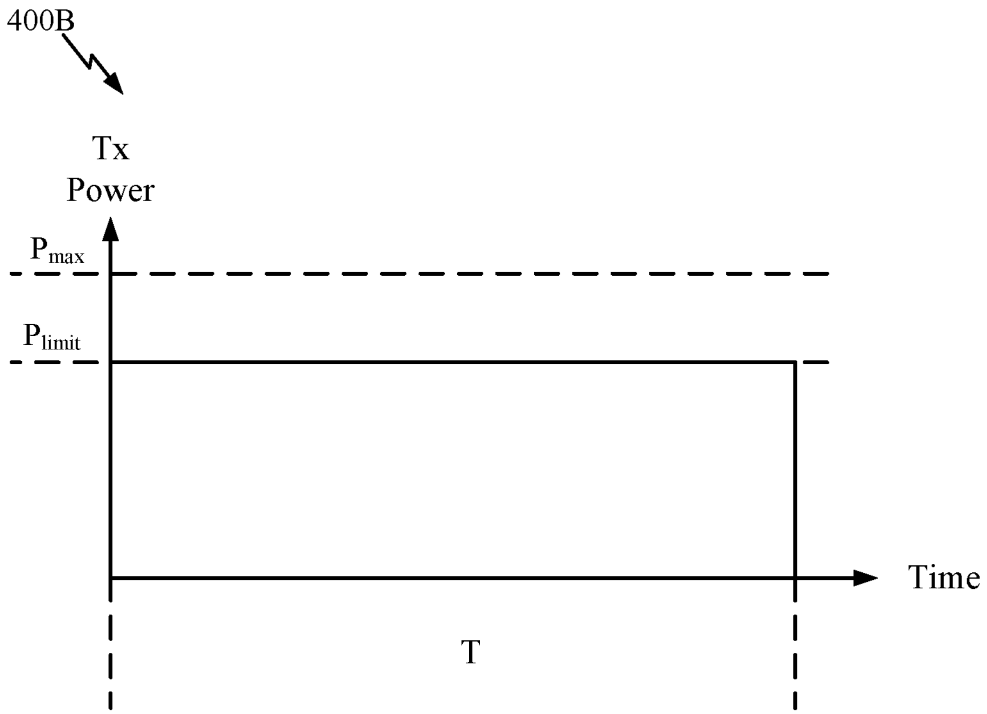

In certain cases, the transmit power may be maintained at the peak transmit power (e.g., $P_{limit}$) allowed for RF exposure compliance that enables continuous transmission during the time window. For example, FIG. 4B is a graph 400B of a transmit power over time illustrating an example where the transmit power is limited to $P_{limit}$, in accordance with certain aspects of the present disclosure. As shown, the UE can transmit continuously at $P_{limit}$ in compliance with the RF exposure limit.

Example Transmit Antenna Grouping

As noted, a wireless communication device may have multiple antennas, which can enable the device to transmit via one or more directions at different locations of the device. For example, multi-mode/multi-band UEs have multiple transmit antennas, which can simultaneously transmit in sub-6 GHz bands and bands greater than 6 GHZ bands, such as mm Wave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless communication device may limit maximum transmit power for both sub-6 GHZ bands and bands greater than 6 GHZ.

In certain cases, although antennas may be positioned in different locations across a UE, a time-averaging algorithm for RF exposure compliance may assume all transmit antennas are collocated in a central location on the UE. Under such an assumption, the total transmit power of all transmit antennas may be limited regardless of the actual exposure scenario (e.g., head exposure, body exposure, or extremity exposure) of separate antennas. For example, suppose the user's hand covers the location of the collocated model, while specific antennas are not covered by the user's hand. That is, antennas may contribute to the RF exposure differently depending on the location of the exposure. Enforcing the collocated model may lead to limiting the transmit power of specific antennas not actually covered by the user's hand. That is, the assumption that the transmit antennas are collocated for RF exposure compliance may provide a needlessly low transmit power, which may affect uplink performance such as uplink data rates, uplink carrier aggregation, and/or an uplink connection at the edge of a cell.

Figure 5:
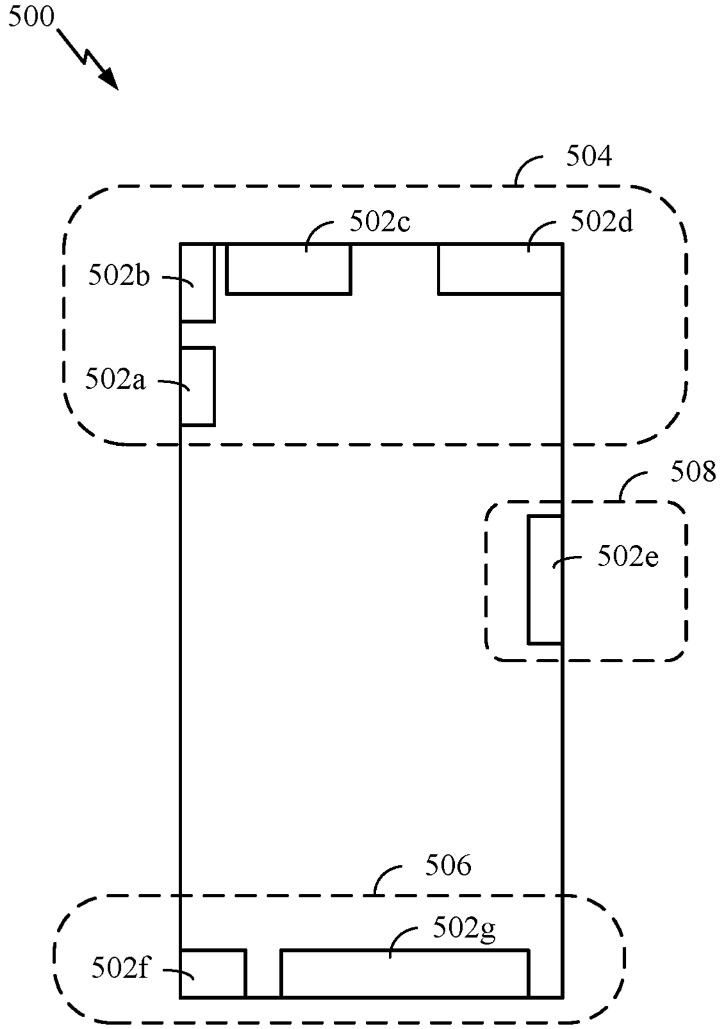
FIG. 5 is a block diagram illustrating an example grouping of multiple antennas of a wireless communication device, in accordance with certain aspects of the present disclosure.

FIG. 5 is a block diagram illustrating an example grouping of multiple antennas of a wireless communication device 500, in accordance with certain aspects of the present disclosure. In this example, the wireless communication device 500 (e.g., a UE 120, such as a smartphone, or any of the wireless communication devices described herein) includes a first antenna 502*a*, a second antenna 502*b*, a third antenna 502*c*, a fourth antenna 502*d*, a fifth antenna 502*e*, a sixth antenna 502*f*, and a seventh antenna 502*g*. In this example, the antennas 502*a*-502*g* are separated into three antenna groups 504, 506, 508, which roughly correspond to a top of the device 500, a bottom of the device 500, and a side of the device 500, when the device 500 is held in the upright position. Those of skill in the art will appreciate that more or less than seven antennas may be implemented, and/or more or less than three antenna groupings may be defined. Each of the illustrated antennas 502*a*-502*g* may represent a single antenna, an array (e.g., a phased array) of antennas, or a module including one or more antennas. The antenna groups 504, 506, 508 may each include one or more antennas that are configured to transmit in a certain frequency band (e.g., very high (e.g., mmWave bands), high (e.g., 6-7 GHZ bands), medium (e.g., 3-6 GHz bands), or low (e.g., 400 MHZ-3 GHz bands)), or the antenna groups may each include one or more antennas that are configured to transmit in multiple frequency bands. While the groups 504, 506, 508 illustrate that no antenna is included in more than one group, an antenna (e.g., the antenna 502*e*) may be included in multiple groups.

The antenna groupings described herein may be assigned into various antenna groupings (such as a mmWave grouping, a sub-6 GHz grouping, a low band grouping (e.g., 400 MHZ-3 GHZ bands), a mixed-mode grouping (e.g., mmWave and sub-6 GHZ grouping)), for example, for differing transmit scenarios. As an example, under a mm Wave grouping, each mm Wave module (e.g., the first antenna 502*a*, the third antenna 502*c*, and the fifth antenna 502*e*) may be treated as a separate antenna group, where each mmWave module may have multiple antenna elements (e.g., 4, 5, 8, 10, etc. dual polarization antenna elements) arranged in one or more arrays. The mmWave module may be capable of transmitting various beams via predefined antenna configurations, where the beams may form a codebook. Under a sub-6 GHz grouping, sub-6 GHZ antennas may be grouped into separate groups. For example, the second and fourth antennas 502*b*, 502*d* may be assigned to a group, and the sixth and seventh antennas 502*f*, 502*g* may be assigned to another group. In certain cases, the antennas 502*a*-502*g* may be assigned to a mixed-mode grouping, such as the three antenna groups 504, 506, 508.

The antenna groups may be defined and/or operated so as to be mutually exclusive in terms of RF exposure. In certain aspects, the transmit power of one or more of the groups (or of one or more of the antennas within one or more groups) may be reduced such that the (normalized) sum of the exposure of all antenna groups, or of overlapped RF exposure distributions, are less than a particular value (e.g., 1.0). For example, backoff factors may be determined for one or more groups, or one or more antennas within one or more groups, and applied so as to limit transmission power for the antenna(s) and/or groups. In certain aspects, antennas in different antenna groups are far enough away from each other such that their exposures do not overlap in the range in which a exposure to a user is measured or defined. In certain aspects, existing regulatory approaches that meet predefined criteria like SAR peak location separation ratio (SPLSR) may be used to determine such mutual exclusivity (for example, as described in Section 4.3.2c of the FCC KDB 447498 D01 General RF Exposure Guidance v06). The mutual exclusivity of the antenna groups may enable the RF exposure manager 122 or 281 to determine the time-averaged RF exposures for each of the antenna groups in parallel with (e.g., independent of) each other.

In some examples, antenna groups for a device (e.g., the wireless communication device 500) are defined in documents presented to and/or published by a regulatory body during the process of demonstrating or certifying that the device complies with RF exposure requirements.

The antenna groups are static in some examples. In other examples, the antenna groups change over time or based on scenario.

In certain aspects described herein, a wireless communication device may determine a transmission power limit for an uplink transmission based on the uplink grant type for the uplink transmission, the available RF exposure margin, and the antenna group(s) to which the set of antennas are assigned.

Example Enhanced Transmission Power Limit and Joint Input Power Limit for Transmissions from Multiple Antenna Ports for RF Exposure Compliance In conventional uplink transmission scenarios, the wireless communication device may not consider the type of uplink grant when determining the maximum transmission power to ensure compliance with an RF exposure limit. In certain cases, the lack of consideration of the uplink grant type can lead to the wireless communication device needlessly using a low transmission power to maintain RF exposure compliance.

Consider, for example, a 5G uplink (UL) MIMO configuration, in which the transmission power limit associated with an RF exposure limit has to be split among the transmit (TX) chains/antenna ports of the wireless communication device. In such an example, blindly applying the split power limits to each TX chain without using the information of the uplink grant type (e.g., MIMO grant or SISO grant) and the antenna port (AP)-to-antenna group (AG) mapping may cause performance degradation in the uplink transmission. For instance, for a 2 TX chain configuration, the total transmission power limit (e.g., SAR power limit) associated with an RF exposure limit (e.g., SAR) should not be split among the 2 TX chains when a SISO grant is scheduled, since this can lead to a needlessly low transmit power for the SISO transmission, which only uses one TX chain. Likewise, for a 2 TX chain configuration, backoff (e.g., a power backoff factor) should not be applied to the total transmission power limit for each TX antenna when the 2 TX antennas are mapped to different antenna groups (e.g., there is no spatial overlapping of radio exposure), since this can also lead to a needlessly low transmit power for a 2 TX MIMO transmission.

Certain aspects of the present disclosure provide various techniques for enhancing transmission power limits for transmissions from multiple antenna ports in compliance with RF exposure limits. In particular, certain aspects enable the wireless communication device to take into account the type of uplink grant when determining the transmission power limit for each antenna in a set of antennas associated with the wireless communication device.

Figure 6:
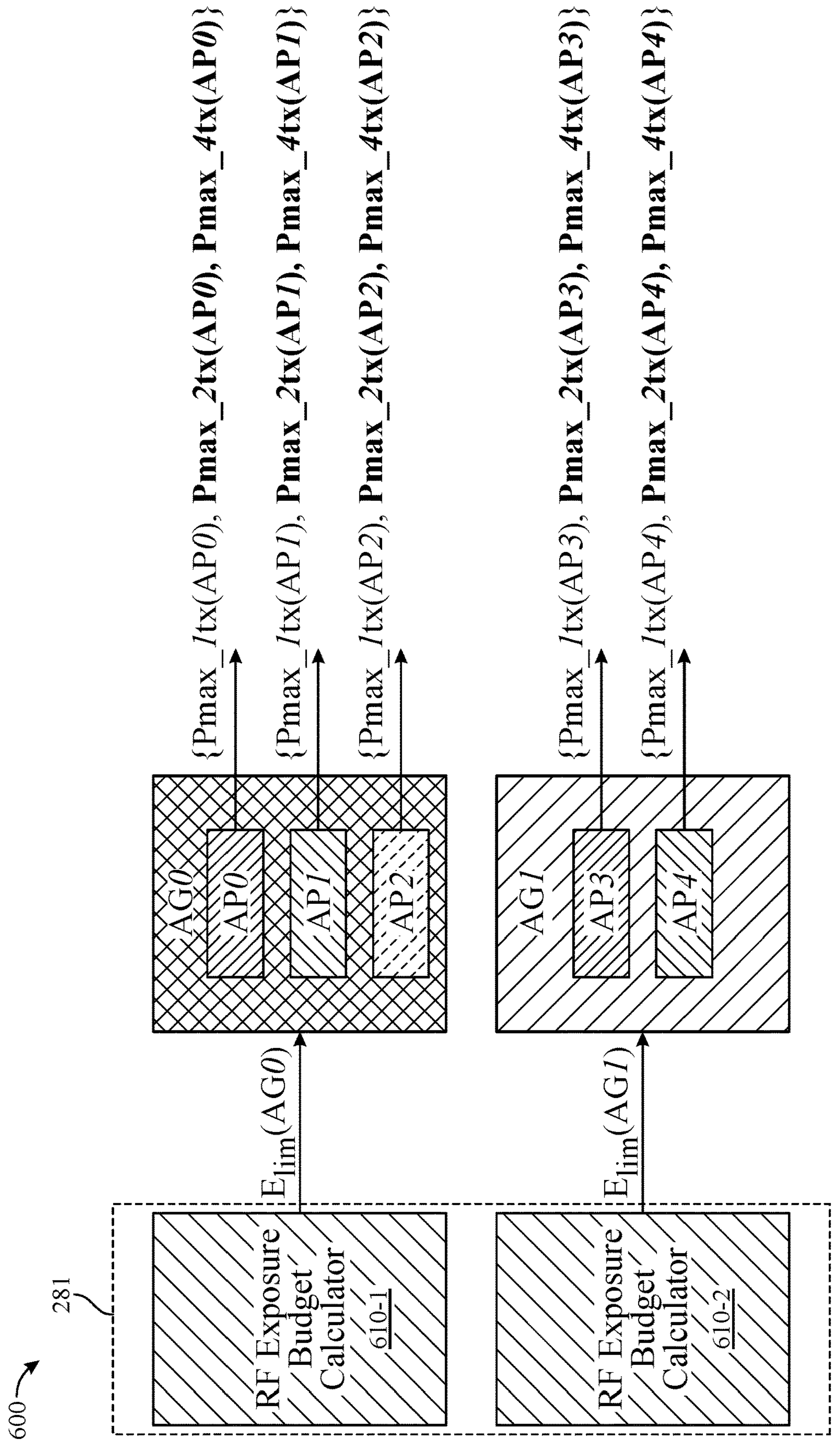
FIG. 6 illustrates an example of enhancing transmission power limits for multiple-input, multiple-output (MIMO) transmissions in compliance with RF exposure limits, in accordance with certain aspects of the present disclosure.

FIG. 6 is a block diagram illustrating an example implementation of the RF exposure manager 281 that is configured to enhance transmission power limits for transmissions from multiple antenna ports in compliance with RF exposure limits, in accordance with certain aspects of the present disclosure. As shown, the RF exposure manager 281 includes an RF exposure budget calculator 610-1 and an RF exposure budget calculator 610-2. Each RF exposure budget calculator 610-1, 610-2 may track previous transmit powers from a respective antenna group and calculate the available transmit energy budget for the respective antenna group based on the RF exposure limit. While illustrated separately, a single budget calculator for multiple (or all) antenna groups may be used.

Here, the RF exposure budget calculator 610-1 is configured to calculate the available RF exposure budget/margin ($E_{lim}$(AG0)) for antenna group AG0 of the wireless communication device (e.g., UE 120), and the RF exposure budget calculator 610-2 is configured to calculate the available RF exposure budget/margin ($E_{lim}$(AG1)) for antenna group AG1 of the wireless communication device. As used herein, radio exposure from antennas coupled to two or more antenna ports in an antenna group may overlap. Here, for example, AG0 includes three antenna ports (AP0, AP1, and AP2) in which the radio exposure from two or more of AP0, AP1, and AP2 may overlap. Similarly, AG/includes two antenna ports (AP3 and AP4) which may have overlapping radio exposures.

An antenna port may comprise a physical or RF antenna connector. The antenna port may be coupled to a single antenna, or may be coupled to multiple antennas, for example antennas arranged in a phased array and/or within a (e.g., mmW) module. In some examples, each antenna port is coupled to a respective transmit and/or receive chain.

In certain aspects, the RF exposure manager 281 may determine, for each antenna port (APx) in an antenna group (AGm), a transmission power limit associated with a single output (e.g., SISO) transmission (Pmax_1tx) from the antenna port (APx), based on the available RF exposure margin for the antenna group ($E_{lim}$(AGm)) and an RF exposure input power limit measurement (Plim_in_1tx (APx)). For example, the transmission power limit associated with SISO transmission from the antenna (e.g., Pmax_1tx(APx)) may be proportional to $E_{lim}$(AGm)*Plim_in_1tx(APx), where x represents a particular transmit antenna port APx in a given antenna group AGm. As shown in FIG. 6, the RF exposure manager 281 determines Pmax_1tx(AP0) for AP0, Pmax_1tx(AP1) for AP1, Pmax_1tx(AP2) for AP2, Pmax_1tx(AP3) for AP3, and Pmax_1tx(AP4) for AP4.

In certain aspects, in addition to determining a transmission power limit associated with single output transmission from each antenna, the RF exposure manager 281 may determine a set of transmission power limits associated with different multiple output grants (e.g., 2 TX MIMO grant, 4 TX MIMO grant, etc.), based on the antenna-port-to-antenna-group mapping of the configured TX chains. For example, as shown in FIG. 6, the RF exposure manager 281 also determines: Pmax_2tx(AP0) and Pmax_4tx(AP0) for AP0; Pmax_2tx(AP1) and Pmax_4tx(AP1) for AP1; Pmax_2tx(AP2) and Pmax_4tx(AP2) for AP2; Pmax_2tx (AP3) and Pmax_4tx(AP3) for AP3; and Pmax_2tx(AP4) and Pmax_4tx(AP4) for AP4.

In certain aspects, the value of Pmax_ntx(APx) for APx and n transmit antennas (or antenna ports) may be based on the antenna-port-to-antenna-group mapping and the uplink grant type (e.g., SISO, 2 TX MIMO, 4 TX MIMO, etc.). For example, when the uplink grant type is MIMO transmission and each configured antenna is in the same antenna group, the transmission power limit for each antenna may be based on a power split factor (δ(APx)). The power split factor may be a function of the single output RF exposure input power limit measurements for the antenna ports in the grant. For a two output grant, for example, the power split factor may be a function of the Plim_in_1tx(APx) and Plim_in_1tx(APy) for APx and APy configured for 2 TX MIMO. For instance, for a 2 TX MIMO from AP3 and AP4 in the same AG1, Pmax_2tx(AP3)=Pmax_1tx(AP3)*δ(AP3), and Pmax_2tx (AP4)=Pmax_1tx(AP4)*δ(AP4). In this instance, the value of the power split factor δ(AP3) and δ(AP4) may be approximately 0.5 for 2 TX MIMO configuration, for example when Plim_in_1tx(APx) and Plim_in_1tx(APy) are approximately equal. In another instance, for a 4 TX MIMO from APj in the same antenna group, Pmax_4tx(APj)=Pmax_1tx (APj)*δ(APj) for j={0, 1, 2, 3}. In this instance, the power split factor values may all be approximately equal to 0.25 (based on the number of antennas and all the Plim_in_1tx (APj) that belong to the same antenna group).

In another example, when the uplink grant type is MIMO transmission and each of the configured antennas is in a different antenna group, the transmission power limit for each antenna may be based on the SISO transmission power limit for the antenna. That is, in this particular example, a power split factor may not be applied to the transmission power limits. For instance, for a 2 TX MIMO from AP/in AG0 and from AP4 in AG1, Pmax_2tx(AP1)=Pmax_1tx (AP1), and Pmax_2tx(AP4)=Pmax_1tx(AP4). In another instance, for a 4 TX MIMO from APj where each APj is in a different antenna group, Pmax_4tx(APj)=Pmax_1tx(APj) for j={0, 1, 2, 3}.

In another example, when the uplink grant type is MIMO transmission, a first set of the configured antennas are in the first antenna group, and a second set of the configured antennas are in a second antenna group, (i) the transmission power limits for the first set of the antennas may be based on a power split factor for the first antenna group (e.g., δ(APx), for APx in AG0) and the SISO transmission power limits for antennas in the first antenna group and (ii) the transmission power limits for the second set of antennas may be based on a power split factor for the second antenna group (e.g., δ(APx), for APx in AG1) and the SISO transmission power limits for antennas in the second antenna group. For instance, for a 4 TX MIMO from AP0 and AP/in AG0 and from AP3 and AP4 in AG1, Pmax_4tx(AP0)=Pmax_1tx (AP0)*δ(AP0). Pmax_4tx(AP1)=Pmax_1tx(AP1)*δ(AP1), Pmax_4tx(AP3)=Pmax_1tx(AP3)*δ(AP3), and Pmax_4tx (AP4)=Pmax_1tx(AP4)*δ(AP4), where δ(APx) for x=0, 1, 3, 4, are approximately equal to 0.5 (e.g., for the case that Plim_in_1tx(APx)≅Plim_in_1tx(APy) for x=0 and y=1, and for x=3 and y=4). In another instance, for a 4 TX MIMO from APj in the same antenna group where j={0, 1, 2} and from APk in another antenna group where k=3, Pmax_4tx (APj)=Pmax_1tx(APj)*δ(APj) for j={0, 1, 2} where δ(APj)≅1/3 for Plim_in_1tx(AP0)≅Plim_in_1tx (AP1)≅Plim_in_1tx(AP2), and Pmax_4tx(APk)=Pmax_1tx (APk) for k=3.

The power split factor for each transmitting antenna port in an antenna group is described in the examples above as being equal. For example, the power split factor may be equal to one divided by the number of transmitting antenna ports (e.g., from the uplink grant). In other examples, the power split factors for transmitting antenna ports in an antenna group may be unequal. In some such examples, the power split factors for the transmitting antenna ports in an antenna group are based on a ratio of the single output RF exposure input power limit measurements for the transmitting antenna ports. The power split factors may additionally or alternatively be based on a service associated with, a priority of, and/or a QoS of the transmitting antenna ports in an antenna group, among other criteria. The sum of the power split factors for all transmitting antenna ports in an antenna group may be equal to or less than one. This sum may be approximately equal or may vary across all antenna groups which include at least one transmitting antenna port (e.g., determined from the uplink grant).

In certain aspects, upon receiving an indication of a type of uplink grant (e.g., SISO transmission or n TX MIMO for n>1), the wireless communication device may calculate and/or select the appropriate transmission power limit (Pmax_ntx(APx)) for the antenna x based on the uplink grant type, antenna group to which the antenna x is assigned, and available RF exposure margin, and may apply the transmission power limit to the uplink transmission in real-time. In this manner, aspects described herein enable a wireless communication device to send uplink transmissions from multiple antenna ports based on potentially higher transmission power limits in compliance with RF exposure limits.

Aspects of the present disclosure also provide techniques for enhancing joint input transmission power limit for transmissions from multiple antenna ports based on the type of uplink grant in compliance with RF exposure limits.

For example, wireless communication device manufacturers typically measure RF exposure input power limits (e.g., SAR input power limits) for a set of antennas, one antenna at a time, and assume that there will be overlapping radio exposure when multiple antennas transmit at the same time. Consequently, when an n TX MIMO is configured, a fixed backoff is generally applied to the RF exposure input power limit for each antenna (e.g., the RF exposure input power limit for each of 2 antennas is backed off 3 decibels (dB) when 2 TX MIMO is configured). Consider the scenario 700 depicted in FIG. 7, which illustrates an example individual antenna RF exposure input power limit measurement, according to certain aspects of the present disclosure. As shown, Plim_in_1tx(APx) for x={0, 1} is measured one antenna at a time.

Figure 7:
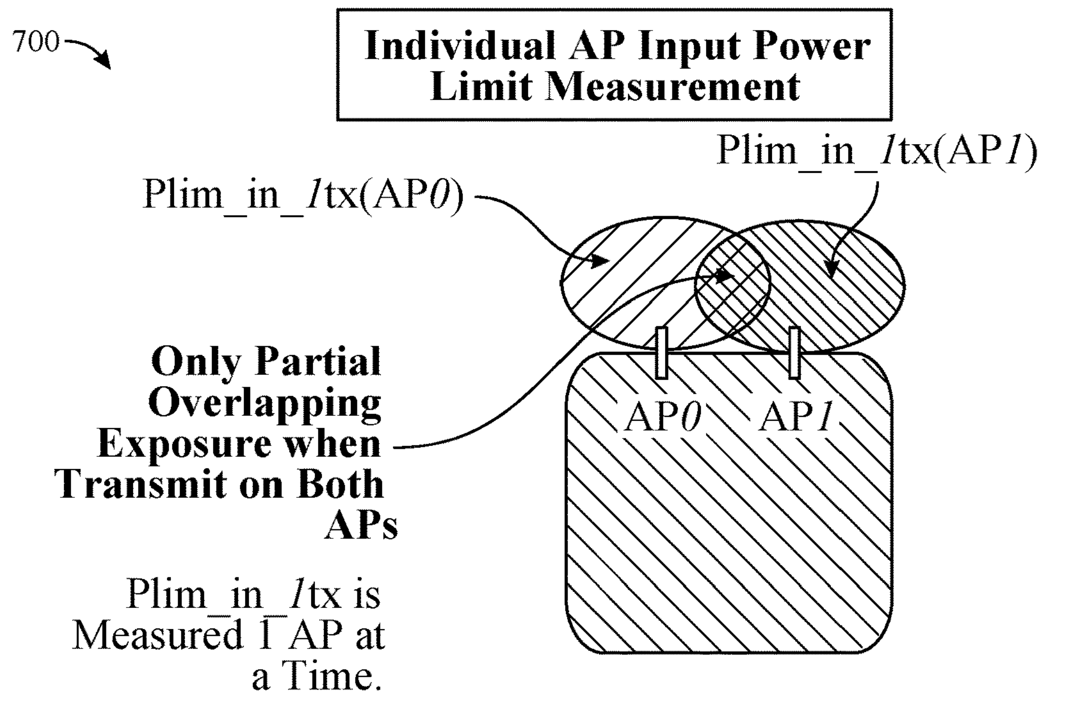
FIG. 7 illustrates an example individual antenna RF exposure input power limit measurement, in accordance with certain aspects of the present disclosure.

However, in many cases, the MIMO TX radio exposure from different antennas may partially overlap or, in some cases, not overlap. As shown in FIG. 7, for example, there is a partial overlapping exposure from AP0 and AP/when transmitting on both antennas. In such cases, applying a fixed backoff to the RF exposure input power limit for each antenna may be inefficient in terms of radio exposure management. In FIG. 7, for example, the joint RF exposure power limit measurement for AP0 and AP1. Plim_in_2tx (AP0, AP1)>min {Plim_in_1tx(AP0), Plim_in_1tx(AP1)}/2, due to the partial overlapping of radio exposure of AP0 and AP1. As such, when an uplink transmit antenna switch diversity algorithm applies the available RF exposure margin for candidate antenna pairs for a MIMO transmission, the existing approach of using a single antenna RF exposure input power limit measurement may lead to the wireless communication device needlessly using a lower transmission power to comply with the RF exposure limit (e.g., since an unnecessarily fixed backoff may be applied to the individual RF exposure input power limit measurement for each antenna).

Accordingly, certain aspects described herein provide techniques for performing a joint RF exposure input power limit measurement (e.g., for multiple APs) and using the joint RF exposure input power limit measurement when determining the transmission power limit for a set of antennas for a transmission from multiple antenna ports. More specifically, in addition to performing an individual RF exposure input power limit measurement (Plim_in_1tx (APx)), a joint RF exposure input power limit measurement (Plim_in_ntx(APx, APy, . . . . APz) for n>1) may be performed for all possible (e.g., MIMO) antenna candidate pairs (e.g., 2 TX MIMO, 4 TX MIMO, etc.) in an antenna group. The joint RF exposure input power limit measurements may then be stored (e.g., in a database and/or in memory on the device itself, for example the memory 282). Such measuring may be performed in a factory or calibration environment, and the stored measurements may be accessed during operation of the device. When an n TX MIMO is scheduled (with the n antenna ports being in the same antenna group), the wireless communication device may retrieve the appropriate joint RF exposure input power limit measurement for the n antennas, and use the joint RF exposure input power limit measurement when determining the transmission power limits for the n antennas.

Figure 8:
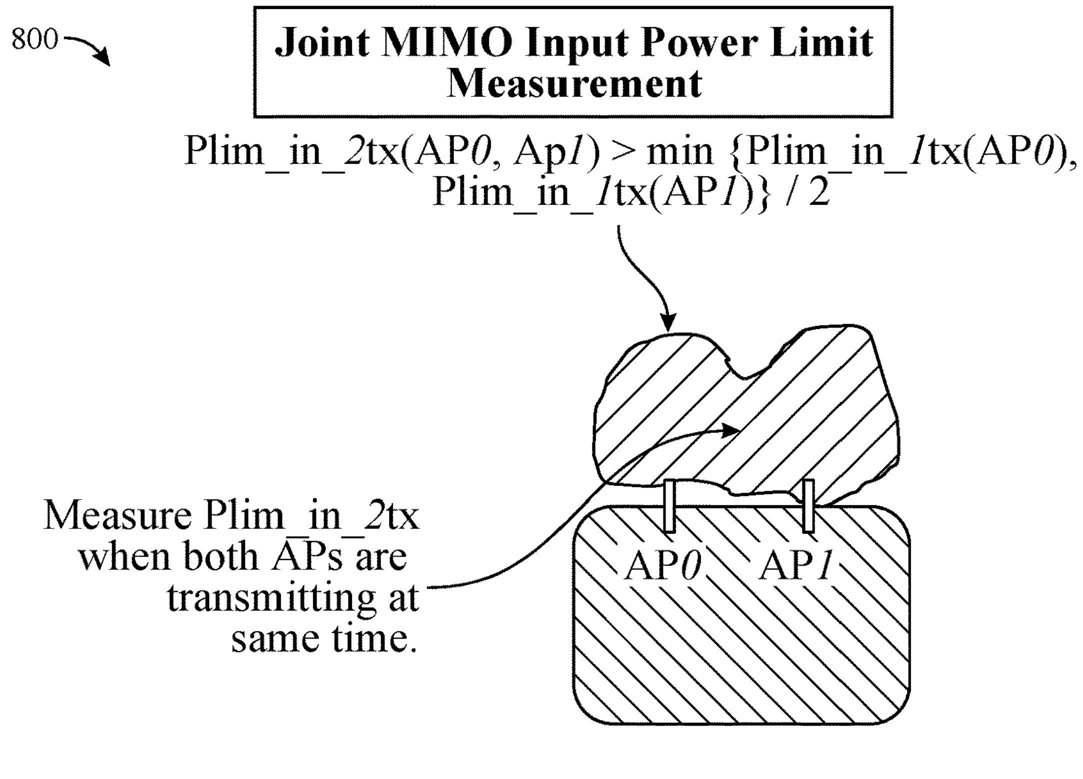
FIG. 8 illustrates an example joint antenna RF exposure input power limit measurement, in accordance with certain aspects of the present disclosure.

As a reference example, consider the scenario 800 depicted in FIG. 8, which illustrates an example joint RF exposure input power limit measurement for 2 antennas AP0 and AP1, according to certain aspects of the present disclosure. As shown, the joint RF exposure input power limit, Plim_in_2tx(AP0, AP1), is measured when both antennas are transmitting at the same time. In this case, Plim_in_2tx (AP0, AP1)>min {Plim_in_1tx(AP0), Plim_in_1tx(AP1)}/2.

In this example, when a 1 TX UL grant (e.g., SISO transmission) is scheduled, the wireless communication device may calculate Pmax_1tx(APx) from Plim_in_1tx (APx), as described above. On the other hand, when a n TX UL grant, n>1 (e.g., MIMO transmission) is scheduled, the wireless communication device may calculate Pmax_ntx (APx) from Plim_in_ntx(APx, APy, . . . . APz). In one example, Pmax_ntx(APx)=Pmax_ntx(APy)= . . . =Pmax_ntx(APz) are proportional to ($E_{lim}$*Plim_in_ntx(APx, APy, . . . , APz)), when joint MIMO Plim_in of AP tuple (x, y, . . . , z) is available.

Certain examples above are described with respect to SISO and MIMO operation. The techniques described herein, however, may be applied to any system and/or types of communications which may receive an uplink grant (or other indication or instruction from a network) to utilize either a single antenna or multiple antennas. For example, a wireless communication device might receive an instruction or grant indicating that it should transmit using carrier aggregation from multiple antennas.

In some examples, uplink grants are received for increments of 10 ms (or less), and in some examples 1 ms or less. In some examples, the RF exposure budget/margin (e.g., $E_{lim}$) is determined (e.g., by the RF exposure manager 281) less frequently than uplink grants are received. For example, the RF exposure budget or margin may be determined approximately every 250 ms or 500 ms or 1 second. The timescale for determining the RF exposure budget or margin may therefore be one or two (or more) orders of magnitude larger than the timescale for receiving the uplink grants. Transmission power limits (e.g., Pmax_ntx) may be determined (e.g., by the RF exposure manager 281) for every uplink grant (or on a similar timescale as uplink grants, for example in the range of several or tens of milliseconds) based on the most recent determined RF exposure budget/margin. Thus, the transmission power limits may vary during a certain segment of time over which $E_{lim}$ is held constant. In some examples, the RF exposure manager determines the RF exposure budget/margin (e.g., $E_{lim}$) for a future time interval in a rolling/sliding time window based on past exposure in the time window.

In some examples, a portion of the RF exposure manager (e.g., 281) which determines the RF exposure budget/margin is different from a portion of the RF exposure manager which determines the transmission power limits. This difference may be logical (e.g., different routines or algorithms within a set of software code) and/or physical (e.g., implemented on different chips). In some examples, a respective portion is associated with each radio being controlled for exposure compliance, and the respect portion determines the transmission power(s) for that radio. The radio may be associated with one or more transmission chains and one or more APs in one AG or across AGs. A radio correspond to one or more active bands, transceivers, and/or RATs (e.g., CDMA, LTE, NR, IEEE 802.11, Bluetooth, non-terrestrial communications, etc.) used for wireless communications. The portion which determines the RF exposure budget/margin may comprise a central manager or other portion which determines RF exposure budgets/margins for multiple (or all) radios so as to manage the overall exposure for the wireless communication device. While a separate RF exposure budget/margin is described above for each antenna group, in some examples the same the RF exposure budget/margin is used for multiple antenna groups (e.g., for sub6 antennas across multiple AGs). Further, the RF exposure budget/margin may not be determined for all antennas in an antenna group; for example, separate RF exposure budgets/margins may be determined for different antennas in the same antenna group (e.g., a budget for sub6 antennas in the group and another budget for mmW antennas in the group).

FIG. 9 is a flow diagram illustrating example operations 900 for wireless communication, in accordance with certain aspects of the present disclosure. The operations 900 may be performed, for example, by a UE (such as the UE 120*a* in the wireless communication network 100). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may optionally begin, at block 902, where the UE (e.g., UE 120*a*) may receive, from a network entity (e.g., the BS 110), an uplink grant scheduling an uplink transmission from a set of antennas. The uplink grant may indicate a transmission mode for the uplink transmission. For example, the transmission mode may be SISO transmission or MIMO transmission with n TX antennas. For a SISO transmission, for example, the set may include one antenna (e.g., n=1), whereas for MIMO transmission the set may include multiple antennas (e.g., n>1). The value of n may be equal to or less than a number of antennas/APs/transmit chains that were previously configured for transmission (e.g., based on an exchange with a network entity).

At block 904, the UE determines, for each antenna in the set of antennas, a respective transmission power limit (e.g., Pmax_ntx(APx)) based at least in part on the transmission mode and in compliance with an RF exposure limit (e.g., $E_{lim}$). At block 906, the UE sends, via the set of antennas, the uplink transmission according to the respective transmission power limits.

In certain aspects, the operations 900 may further include determining, for each antenna in the set of antennas, an antenna group to which the antenna is assigned among one or more antenna groups. In such aspects, the transmission power limit for the antenna (in block 904) may be further determined based on the antenna group to which the antenna is assigned. The transmission power limit for the antenna (in block 904) may be further determined based on one or more RF exposure limit (e.g., $E_{lim}$) for the antenna group to which the antenna is assigned.

Additionally, in certain aspects, a first value of the transmission power limit for each of a plurality of antennas in the set of antennas may be greater than a second value of the transmission power limit for each of the plurality of antennas when each of the plurality of antennas is assigned to a different antenna group. For example, as noted above, the transmission power limit may be greater for each of a plurality of antennas when the plurality of antennas are in different antenna groups compared to when the plurality of antennas are in the same antenna group. The first value of the transmission power limit may be a transmission power limit associated with SISO transmission (e.g., Pmax_1tx(APx)), and the second value of the transmission power limit may be a transmission power limit associated with SISO transmission and a power split factor (e.g., Pmax_1tx(APx)*δ(APx)).

In certain aspects, the determination of the transmission power limit for each antenna (in block 904) may include determining a power split factor for the antenna when (i) the transmission mode is MIMO and (ii) the antenna belongs to the same antenna group as at least another antenna in the set of the antennas. In such aspects, the value of the transmission power limit may be based on the power split factor and a predefined transmission power limit configured for the antenna. The predefined transmission power limit may be associated with SISO transmission from the antenna (e.g., Pmax_1tx(APx)). A value of the power split factor may be based on a number of antennas in the same antenna group in the set of antennas, including the antenna that belongs to the same antenna group. For example, the power split factor may be around 0.5 (e.g., $\delta(AP1)\cong 0.5$) when 2 antennas in the set belong to the same antenna group. In another example, the power split factor may be around 0.25 (e.g., δ(APx) =0.25) when 4 antennas in the set belong to the same antenna group.

In certain aspects, the determination of the transmission power limit for each antenna (in block 904) may include setting a value of the transmission power limit to a value associated with SISO transmission from the antenna (e.g., Pmax_1tx(APx)) when the transmission mode is SISO transmission.

In certain aspects, the determination of the transmission power limit for each antenna (in block 904) may include setting a value of the transmission power limit to a value associated with SISO transmission from the antenna when (i) the transmission mode is MIMO and (ii) the antenna is in a different antenna group from each of the other antennas in the set of antennas. In such aspects, the transmission power limit for antenna x may be Pmax_ntx(APx)=Pmax_1tx (APx), for n>1, and the transmission power limit for antenna y may be Pmax_ntx(APy)=Pmax_1tx(APy), for n>1, when antenna x and antenna y are in different antenna groups.

In certain aspects, the determination of the transmission power limit for each antenna (in block 904) may be further based on an RF exposure input power limit measurement (e.g., Plim_in). In some aspects, the RF exposure input power limit measurement may be associated with a single antenna when the transmission mode is SISO transmission. For example, the RF exposure input power limit measurement may be an individual RF exposure input power limit measurement (e.g., Plim_in_1tx(APx)). In other aspects, the RF exposure input power limit measurement may be associated with a plurality of antennas when the transmission mode is MIMO transmission. For example, the RF exposure input power limit measurement may be a joint RF exposure input power limit measurement (e.g., Plim_in_ntx(APx, APy, . . . , APz) for n>1). In some aspects, Plim_in_ntx(APx, APy, . . . , APz)>min {Plim_in_1tx(APx), Plim_in_1tx(APy) Plim_in_1tx(APz)}/n.

While the examples depicted in FIGS. 6-9 are described herein with respect to a UE performing techniques for enhancing transmission power limit and joint RF exposure limit for transmission from multiple antenna ports under RF exposure limits to facilitate understanding, aspects of the present disclosure may also be applied to other wireless communication devices, such as a CPE, performing the techniques described herein. Further, while the examples are described with respect to communication between the UE (or other wireless device) and a network entity, the UE or other wireless device may be communicating with a device other than a network entity, for example another UE or with another device in a user's home that is not a network entity, for example.

It will be appreciated that the techniques and apparatus for enhancing transmission power limit and joint RF exposure limit for transmission from multiple antenna ports under RF exposure limits may provide various advantages, such as desirable uplink performance in compliance with RF exposure standards and/or regulations.

Figure 10:
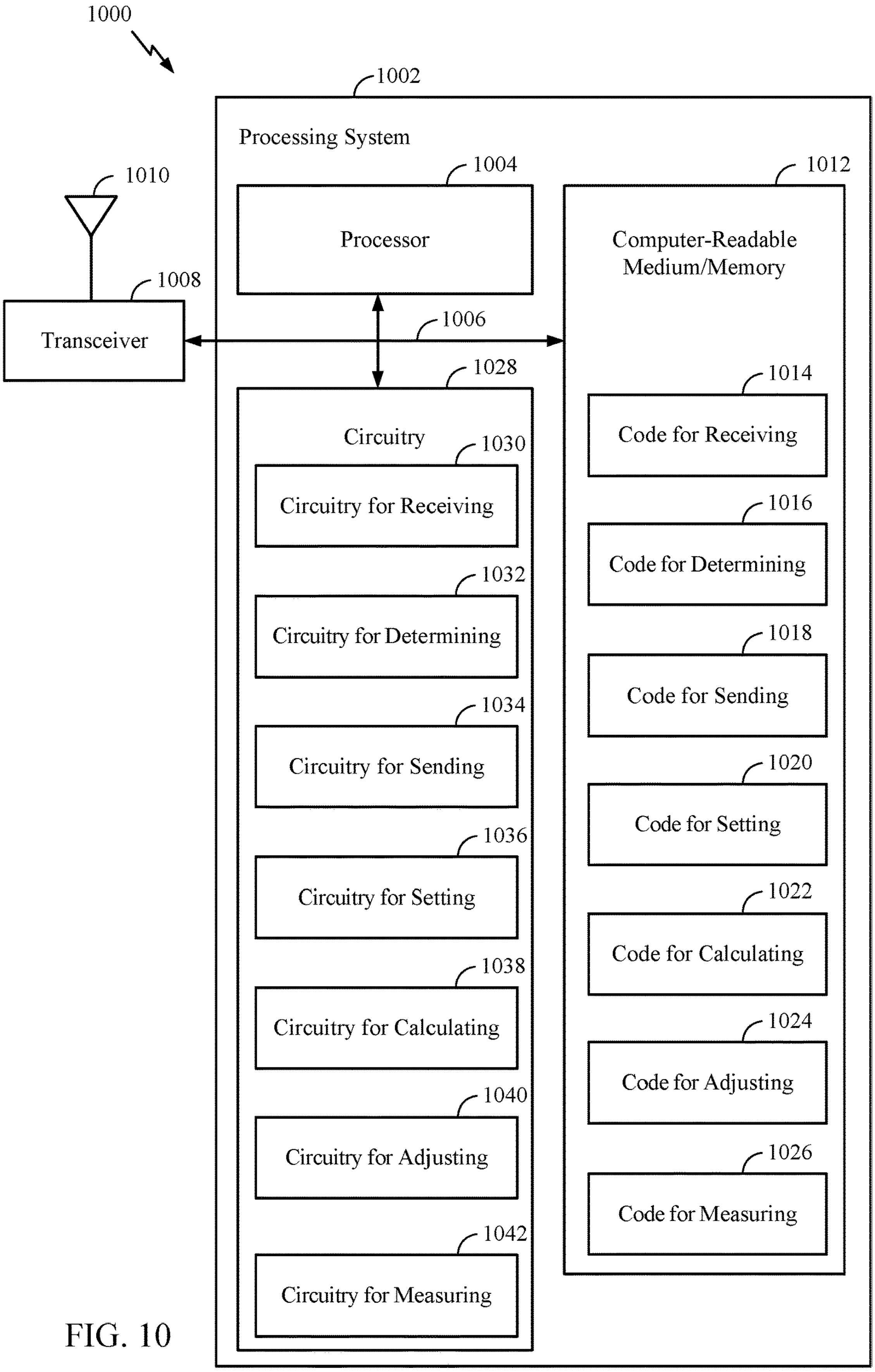
FIG. 10 illustrates a communications device that may include various components configured to perform operations for the techniques disclosed herein, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIG. 9. The communications device 1000 includes a processing system 1002 coupled to a transceiver 100δ(e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 9, or other operations for performing the various techniques discussed herein. In certain aspects, computer-readable medium/memory 1012 stores code for receiving 1014, code for determining 1016, code for sending (or transmitting) 1018, code for setting 1020, code for calculating 1022, code for adjusting 1024, and/or code for measuring 1026. In certain aspects, the processing system 1002 has circuitry 1028 configured to implement the code stored in the computer-readable medium/memory 1012. In certain aspects, the circuitry 1028 is coupled to the processor 1004 and/or the computer-readable medium/memory 1012 via the bus 1006. For example, the circuitry 1028 includes circuitry for receiving 1030, circuitry for determining 1032, circuitry for sending (or transmitting) 1034, circuitry for setting 1036, circuitry for calculating 1038, circuitry for adjusting 1040, and/or circuitry for measuring 1042.

For example, means for transmitting (or means for outputting for transmission) may include a transmitter and one or more antennas, such as the transceiver 254 and/or antenna(s) 252 of the UE **120*a* illustrated in FIG. 2 and/or circuitry for sending (or transmitting) 1034 of the communication device 1000 in FIG. 10. Means for receiving (or means for obtaining) may include a receiver and/or antenna(s) 252 of the UE 120*a* illustrated in FIG. 2 and/or circuitry for receiving 1030 of the communication device 1000 in FIG. 10. Means for measuring, means for determining, means for setting, means for calculating, and/or means for adjusting may include a processing system, which may include one or more processors, such as the receive processor 258, the transmit processor 264, the TX MIMO processor 266, and/or the controller/processor 280 of the UE 120*a* illustrated in FIG. 2, the processing system 1002 of the communication device 1000 in FIG. 10, and/or the circuitry for measuring 1042, circuitry for determining 1032, circuitry for setting 1036, circuitry for calculating 1038, and/or circuitry for adjusting 1040**.

Example Aspects

In addition to the various aspects described above, specific combinations of aspects are within the scope of the disclosure, some of which are detailed below:

Aspect 1: A method for wireless communication by a wireless device, comprising: receiving, from a network entity, an uplink grant scheduling an uplink transmission from a set of antennas, wherein the uplink grant indicates a transmission mode for the uplink transmission; determining, for each antenna in the set of antennas, a respective transmission power limit based at least in part on the transmission mode and in compliance with a radio frequency (RF) exposure limit; and sending, via the set of antennas, the uplink transmission according to the respective transmission power limits.

Aspect 2: The method of Aspect 1, further comprising determining, for each antenna in the set of antennas, an antenna group to which the antenna is assigned among one or more antenna groups, wherein the respective transmission power limit for the antenna is further determined based on the antenna group to which the antenna is assigned and the RF exposure limit.

Aspect 3: The method of Aspect 2, wherein a first value of the transmission power limit for each of a plurality of antennas in the set of antennas is greater than a second value of the transmission power limit for each of the plurality of antennas, wherein the first value is associated with each of the plurality of antennas being assigned to a different antenna group, and wherein the second value is associated with each of the plurality of antennas being assigned to a same antenna group.

Aspect 4: The method according to any of Aspects 2-3, wherein the antenna groups are mutually exclusive in terms of RF exposure.

Aspect 5: The method according to any of Aspects 1-4, wherein determining the respective transmission power limit for each antenna comprises: determining a power split factor for the antenna when (i) the transmission mode is multiple-input multiple-output (MIMO) and (ii) the antenna belongs to a same antenna group as at least another antenna in the set of antennas; and setting a value of the respective transmission power limit based on the power split factor and a predefined transmission power limit configured for the antenna.

Aspect 6: The method of Aspect 5, wherein the predefined transmission power limit is associated with a single-input, single output (SISO) transmission from the antenna.

Aspect 7: The method of Aspect 5, wherein a value of the power split factor is based on a number of antennas in the set of antennas that belong to the same antenna group.

Aspect 8: The method according to any of Aspects 1-7, wherein determining the respective transmission power limit for each antenna comprises setting a value of the transmission power limit to a value associated with a single-input, single-output (SISO) transmission from the antenna when the transmission mode is SISO transmission.

Aspect 9: The method according to any of Aspects 1-8, wherein determining the respective transmission power limit for each antenna comprises setting a value of the transmission power limit to a value associated with a single-input, single-output (SISO) transmission from the antenna when (i) the transmission mode is multiple-input, multiple-output (MIMO) and (ii) the antenna is in a different antenna group from each of the other antennas in the set of antennas.

Aspect 10: The method according to any of Aspects 1-9, wherein, for each antenna in the set of antennas, the respective transmission power limit for the antenna is determined further based on an RF exposure input power limit measurement.

Aspect 11: The method of Aspect 10, wherein the RF exposure input power limit measurement is associated with a single antenna when the transmission mode is single-input, single-output (SISO) transmission or when the transmission mode is multiple-input, multiple-output (MIMO) transmission and the antenna is in a different antenna group from each of the other antennas in the set of antennas.

Aspect 12: The method of Aspect 10, wherein the RF exposure input power limit measurement is associated with a plurality of antennas when the transmission mode is multiple-input, multiple-output (MIMO) transmission and the antenna is in a same antenna group as one or more other antennas in the set of antennas.

Aspect 13: The method according to any of Aspects 1-12, wherein the receiving comprises receiving multiple uplink grants at different times during a time interval, wherein the RF exposure limit comprises a same RF exposure limit for all of the different times, and wherein the determining comprises determining respective transmission power limits for each of the multiple uplink grants based on a mode for each of the multiple uplink grants and the same RF exposure limit.

Aspect 14: An apparatus for wireless communication, comprising: a receiver configured to receive, from a network entity, an uplink grant scheduling an uplink transmission from a set of antennas, wherein the uplink grant indicates a transmission mode for the uplink transmission; a memory; a processor coupled to the memory and being configured to determine, for each antenna in the set of antennas, a respective transmission power limit based at least in part on the transmission mode and in compliance with a radio frequency (RF) exposure limit; and a transmitter configured to send, via the set of antennas, the uplink transmission according to the respective transmission power limits.

Aspect 15: The apparatus of Aspect 14, wherein: the processor is further configured to determine, for each antenna in the set of antennas, an antenna group to which the antenna is assigned among one or more antenna groups; and the respective transmission power limit for the antenna is further determined based on the antenna group to which the antenna is assigned and the RF exposure limit.

Aspect 16: The apparatus of Aspect 15, wherein a first value of the transmission power limit for each of a plurality of antennas in the set of antennas is greater than a second value of the transmission power limit for each of the plurality of antennas, wherein the first value is associated with each of the plurality of antennas being assigned to a different antenna group, and wherein the second value is associated with each of the plurality of antennas being assigned to a same antenna group.

Aspect 17: The apparatus according to any of Aspects 14-16, wherein, in order to determine the respective transmission power limit for each antenna, the processor is configured to: determine a power split factor for the antenna when (i) the transmission mode is multiple-input multiple-output (MIMO) and (ii) the antenna belongs to a same antenna group as at least another antenna in the set of antennas; and set a value of the respective transmission power limit based on the power split factor and a predefined transmission power limit configured for the antenna.

Aspect 18: The apparatus of Aspect 17, wherein the predefined transmission power limit is associated with a single-input, single output (SISO) transmission from the antenna.

Aspect 19: The apparatus of Aspect 17, wherein a value of the power split factor is based on a number of antennas in the set of antennas that belong to the same antenna group.

Aspect 20: The apparatus according to any of Aspects 14-19, wherein, in order to determine the respective transmission power limit for each antenna, the processor is configured to set a value of the transmission power limit to a value associated with a single-input, single-output (SISO) transmission from the antenna when the transmission mode is SISO transmission.

Aspect 21: The apparatus according to any of Aspects 14-20, wherein, in order to determine the respective transmission power limit for each antenna, the processor is configured to set a value of the transmission power limit to a value associated with a single-input, single-output (SISO) transmission from the antenna when (i) the transmission mode is multiple-input, multiple-output (MIMO) and (ii) the antenna is in a different antenna group from each of the other antennas in the set of antennas.

Aspect 22: The apparatus according to any of Aspects 14-21, wherein, for each antenna in the set of antennas, the respective transmission power limit for the antenna is determined further based on an RF exposure input power limit measurement.

Aspect 23: The apparatus of Aspect 22, wherein the RF exposure input power limit measurement is associated with a single antenna when the transmission mode is single-input, single-output (SISO) transmission or when the transmission mode is multiple-input, multiple-output (MIMO) transmission and the antenna is in a different antenna group from each of the other antennas in the set of antennas.

Aspect 24: The apparatus of Aspect 22, wherein the RF exposure input power limit measurement is associated with a plurality of antennas when the transmission mode is multiple-input, multiple-output (MIMO) transmission and the antenna is in a same antenna group as one or more other antennas in the set of antennas.

Aspect 25: An apparatus for wireless communication, comprising: means for performing a method in accordance with any of Aspects 1-13.

Aspect 26: An apparatus, comprising: one or more memories comprising computer-executable instructions, and one or more processors collectively or individually configured to execute the computer-executable instructions and cause the apparatus to perform a method in accordance with any of Aspects 1-13.

Aspect 27: A non-transitory computer-readable medium comprising computer-executable instructions that, when executed by one or more processors of a processing system, cause the processing system to perform a method in accordance with any of Aspects 1-13.

Aspect 28: A computer program product embodied on a computer-readable storage medium comprising code for performing a method in accordance with any of Aspects 1-13.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above.

The invention claimed is:

1. A method for wireless communication by a wireless device, comprising:

receiving, from a network entity, an uplink grant scheduling an uplink transmission from a set of antennas, wherein the uplink grant indicates a transmission mode for the uplink transmission;

determining, for each antenna in the set of antennas, a respective transmission power limit in compliance with a radio frequency (RF) exposure limit, based at least in part on (i) the transmission mode and (ii) an RF exposure input power limit measurement that is associated with simultaneous transmission from a plurality of antennas in the set of antennas when the transmission mode is multiple-input, multiple-output (MIMO) transmission and the antenna is in a same antenna group as one or more other antennas in the set of antennas, wherein:

the RF exposure input power limit measurement comprises a joint RF exposure input power limit measurement associated with the simultaneous transmission from the plurality of antennas; and the joint RF exposure input power limit measurement is greater than a minimum single-antenna RF exposure input power limit measurement divided by a number of the plurality of antennas; and sending, via the set of antennas, the uplink transmission according to the respective transmission power limits.

2. The method of claim 1, further comprising determining, for each antenna in the set of antennas, an antenna group to which the antenna is assigned among one or more antenna groups, wherein the respective transmission power limit for the antenna is further determined based on the antenna group to which the antenna is assigned and the RF exposure limit.

3. The method of claim 2, wherein a first value of the transmission power limit for each of a plurality of antennas in the set of antennas is greater than a second value of the transmission power limit for each of the plurality of antennas, wherein the first value is associated with each of the plurality of antennas being assigned to a different antenna group, and wherein the second value is associated with each of the plurality of antennas being assigned to a same antenna group.

4. The method of claim 2, wherein the antenna groups are mutually exclusive in terms of RF exposure.

5. The method of claim 1, wherein determining the respective transmission power limit for each antenna comprises:

determining a power split factor for the antenna when (i) the transmission mode is MIMO and (ii) the antenna belongs to a same antenna group as at least another antenna in the set of antennas; and setting a value of the respective transmission power limit based on the power split factor and a predefined transmission power limit configured for the antenna.

6. The method of claim 5, wherein the predefined transmission power limit is associated with a single-input, single output (SISO) transmission from the antenna.

7. The method of claim 5, wherein a value of the power split factor is based on a number of antennas in the set of antennas that belong to the same antenna group.

8. The method of claim 1, wherein determining the respective transmission power limit for each antenna comprises setting a value of the transmission power limit to a value associated with a single-input, single-output (SISO) transmission from the antenna when the transmission mode is SISO transmission.

9. The method of claim 1, wherein determining the respective transmission power limit for each antenna comprises setting a value of the transmission power limit to a value associated with a single-input, single-output (SISO) transmission from the antenna when (i) the transmission mode is MIMO and (ii) the antenna is in a different antenna group from each of the other antennas in the set of antennas.

10. The method of claim 1, wherein the RF exposure input power limit measurement is associated with a single antenna when the transmission mode is single-input, single-output (SISO) transmission or when the transmission mode is MIMO transmission and the antenna is in a different antenna group from each of the other antennas in the set of antennas.

11. The method of claim 1, wherein the receiving comprises receiving multiple uplink grants at different times during a time interval, wherein the RF exposure limit comprises a same RF exposure limit for all of the different times, and wherein the determining comprises determining respective transmission power limits for each of the multiple uplink grants based on a mode for each of the multiple uplink grants and the same RF exposure limit.

12. An apparatus for wireless communication, comprising:

a receiver configured to receive, from a network entity, an uplink grant scheduling an uplink transmission from a set of antennas, wherein the uplink grant indicates a transmission mode for the uplink transmission;

a memory;

a processor coupled to the memory and being configured to determine, for each antenna in the set of antennas, a respective transmission power limit in compliance with a radio frequency (RF) exposure limit, based at least in part on (i) the transmission mode and (ii) an RF exposure input power limit measurement that is associated with simultaneous transmission from a plurality of antennas in the set of antennas when the transmission mode is multiple-input, multiple-output (MIMO) transmission and the antenna is in a same antenna group as one or more other antennas in the set of antennas, wherein:

the RF exposure input power limit measurement comprises a joint RF exposure input power limit measurement associated with the simultaneous transmission from the plurality of antennas; and the joint RF exposure input power limit measurement is greater than a minimum single-antenna RF exposure input power limit measurement divided by a number of the plurality of antennas; and a transmitter configured to send, via the set of antennas, the uplink transmission according to the respective transmission power limits.

13. The apparatus of claim 12, wherein:

the processor is further configured to determine, for each antenna in the set of antennas, an antenna group to which the antenna is assigned among one or more antenna groups; and the respective transmission power limit for the antenna is further determined based on the antenna group to which the antenna is assigned and the RF exposure limit.

14. The apparatus of claim 13, wherein a first value of the transmission power limit for each of a plurality of antennas in the set of antennas is greater than a second value of the transmission power limit for each of the plurality of antennas, wherein the first value is associated with each of the plurality of antennas being assigned to a different antenna group, and wherein the second value is associated with each of the plurality of antennas being assigned to a same antenna group.

15. The apparatus of claim 12, wherein, in order to determine the respective transmission power limit for each antenna, the processor is configured to:

determine a power split factor for the antenna when (i) the transmission mode is MIMO and (ii) the antenna belongs to a same antenna group as at least another antenna in the set of antennas; and set a value of the respective transmission power limit based on the power split factor and a predefined transmission power limit configured for the antenna.

16. The apparatus of claim 15, wherein the predefined transmission power limit is associated with a single-input, single output (SISO) transmission from the antenna.

17. The apparatus of claim 15, wherein a value of the power split factor is based on a number of antennas in the set of antennas that belong to the same antenna group.

18. The apparatus of claim 12, wherein, in order to determine the respective transmission power limit for each antenna, the processor is configured to set a value of the transmission power limit to a value associated with a single-input, single-output (SISO) transmission from the antenna when the transmission mode is SISO transmission.

19. The apparatus of claim 12, wherein, in order to determine the respective transmission power limit for each antenna, the processor is configured to set a value of the transmission power limit to a value associated with a single-input, single-output (SISO) transmission from the antenna when (i) the transmission mode is MIMO and (ii) the antenna is in a different antenna group from each of the other antennas in the set of antennas.

20. The apparatus of claim 12, wherein the RF exposure input power limit measurement is associated with a single antenna when the transmission mode is single-input, single-output (SISO) transmission or when the transmission mode is MIMO transmission and the antenna is in a different antenna group from each of the other antennas in the set of antennas.

21. An apparatus for wireless communication, comprising:

means for receiving, from a network entity, an uplink grant scheduling an uplink transmission from a set of antennas, wherein the uplink grant indicates a transmission mode for the uplink transmission;

means for determining, for each antenna in the set of antennas, a respective transmission power limit in compliance with a radio frequency (RF) exposure limit, based at least in part on (i) the transmission mode and (ii) an RF exposure input power limit measurement that is associated with simultaneous transmission from a plurality of antennas in the set of antennas when the transmission mode is multiple-input, multiple-output (MIMO) transmission and the antenna is in a same antenna group as one or more other antennas in the set of antennas, wherein:

the RF exposure input power limit measurement comprises a joint RF exposure input power limit measurement associated with the simultaneous transmission from the plurality of antennas; and the joint RF exposure input power limit measurement is greater than a minimum single-antenna RF exposure input power limit measurement divided by a number of the plurality of antennas; and means for sending, via the set of antennas, the uplink transmission according to the respective transmission power limits.

22. The apparatus of claim 21, further comprising means for determining, for each antenna in the set of antennas, an antenna group to which the antenna is assigned among one or more antenna groups, wherein the means for determining the respective transmission power limit for the antenna is further based on the antenna group to which the antenna is assigned and the RF exposure limit.

23. The apparatus of claim 22, wherein a first value of the transmission power limit for each of a plurality of antennas in the set of antennas is greater than a second value of the transmission power limit for each of the plurality of antennas, wherein the first value is associated with each of the plurality of antennas being assigned to a different antenna group, and wherein the second value is associated with each of the plurality of antennas being assigned to a same antenna group.

24. The apparatus of claim 22, wherein the antenna groups are mutually exclusive in terms of RF exposure.

25. The apparatus of claim 21, wherein means for determining the respective transmission power limit for each antenna comprises:

means for determining a power split factor for the antenna when (i) the transmission mode is MIMO and (ii) the antenna belongs to a same antenna group as at least another antenna in the set of antennas; and means for setting a value of the respective transmission power limit based on the power split factor and a predefined transmission power limit configured for the antenna.

* * * * *